United States Patent [19]

Shimuzu et al.

[11] Patent Number: 5,312,192
[45] Date of Patent: May 17, 1994

[54] BEARING LUBRICATING STRUCTURE FOR ROTARY MACHINERY

[75] Inventors: Noburu Shimuzu; Yasuhiro Niimura, both of Kanagawa, Japan

[73] Assignee: Ebara Corporation, Tokyo, Japan

[21] Appl. No.: 68,173

[22] Filed: May 28, 1993

[30] Foreign Application Priority Data

Jun. 4, 1992 [JP] Japan ............................. 4-170074

[51] Int. Cl.$^5$ ............................................. F16C 33/66
[52] U.S. Cl. .................................. 384/471; 384/462; 384/473; 384/474; 384/476; 384/478
[58] Field of Search ............... 384/471, 476, 478, 474, 384/473, 462

[56] References Cited

U.S. PATENT DOCUMENTS 4,382,638  5/1983  Andoh et al. .................. 384/478
4,541,736  9/1985  Giebeler, Jr. .
4,758,100  7/1988  Güttinger ....................... 384/471
4,987,974  1/1991  Crouch .

FOREIGN PATENT DOCUMENTS 0315761  5/1989  European Pat. Off. .
897347  11/1953  Fed. Rep. of Germany .
58-193997  11/1983  Japan .
61-190490  11/1986  Japan .

*Primary Examiner*—Lenard A. Footland
*Attorney, Agent, or Firm*—Oblon, Spivak, McClelland, Maier & Neustadt

[57] ABSTRACT

A bearing lubricating structure for rotary machinery having a rotor rotatably supported by a bearing in a casing, an oil reservoir provided in a lower part of a bearing chamber accommodating the bearing, and an oil disk attached to an end of a rotating shaft of the rotor and immersed in lubricating oil in the oil reservoir so as to supply the bearing with lubricating oil splashed by the oil disk, wherein a guide groove is provided to collect lubricating oil flowing down an inner wall of a cover attached to an end of the casing; a suction nozzle is inserted into the guide groove to suck lubricating oil collected in the guide groove; a lubricant passage extends through the inside of the rotating shaft to supply the bearing with lubricating oil sucked through the suction nozzle; and an oiling nozzle is communicated with the lubricant passage and performs a pumping action induced by the rotation of the shaft, whereby a sufficiently large amount of lubricating oil is supplied to the bearing.

9 Claims, 2 Drawing Sheets

BEARING LUBRICATING STRUCTURE FOR ROTARY MACHINERY

BACKGROUND OF THE INVENTION

1. Field of the Art

The present invention relates to a bearing lubricating structure for rotary machinery. More particularly, the present invention relates to a bearing lubricating structure for rotary machinery which is suitable for built-in lubrication type positive-displacement compressors, turbocompressors, vacuum pumps or the like.

2. Prior Art

The following are conventional methods of supplying a lubricating oil to a bearing of a rotary machine:

(1) When the peripheral speed of the bearing part is relatively low:

A method wherein a lubricating oil that is splashed by an oil disk and flows down on the inner wall surface of a cover of a bearing housing is supplied to the bearing through an oil supply passage provided in the bearing housing.

(2) When the peripheral speed of the bearing part is relatively high:

A method wherein forced lubrication (jet lubrication) is carried out by a gear pump. For example, see Japanese Patent Application Public Disclosure (KOKAI) No. 58-193997 (1983).

However, the above-described conventional methods (1) and (2) suffer from the following problems.

With the method (1), although the lubricating structure is simple, it is impossible to obtain a sufficiently high feed rate of lubricating oil. Accordingly, this method cannot be adopted for the bearing lubricating structure of a high-speed rotary machine. Further, with the method (1), the rotor shaft and the casing are exposed to a compressed high-temperature gas.

Although the casing is generally provided with a cooling jacket so that it can be cooled, the rotor shaft cannot be cooled and hence heats up to a high temperature. Accordingly, while the outer ring of a rolling bearing attached to the casing does not heat up to a high temperature, the inner ring that is attached to the shaft is heated to a high temperature. Therefore, there is a likelihood that the required bearing clearance will not be ensured and the bearing will burn out. In addition, if the feed rate of lubricating oil is low, a sufficient cooling effect cannot be obtained. Therefore, it is impossible to reduce the temperature difference between the inner and outer rings.

With the method (2), although it is possible to obtain a sufficiently high feed rate of lubricating oil, a gear pump and oil supply piping are needed. Accordingly, this method invites a rise in costs and lacks compactness and ease of use.

SUMMARY OF THE INVENTION

In view of the above circumstances, it is an object of the present invention to eliminate the above-described problems and to provide a bearing lubricating structure for rotary machinery which has a simple structure and which is capable of supplying a bearing with a sufficiently large amount of lubricating oil and of minimizing a temperature difference between the inner and outer rings of the bearing.

To solve the above-described problems, the present invention provides a bearing lubricating structure for rotary machinery having a rotor rotatably supported by a bearing in a casing, an oil reservoir provided in a lower part of a bearing chamber accommodating the bearing, and an oil disk attached to an end of a rotating shaft of the rotor and immersed in lubricating oil in the oil reservoir so as to supply the bearing with lubricating oil splashed by the oil disk, wherein the bearing lubricating structure includes a guide groove for collecting lubricating oil flowing down the inner wall of a cover attached to an end of the casing, a suction nozzle is inserted into the guide groove to suck lubricating oil collected in the guide groove, a lubricant passage extends through the inside of the rotating shaft to supply the bearing with lubricating oil sucked through the suction nozzle, and an oiling nozzle is communicated with the lubricant passage and performs a pumping action induced by the rotation of the shaft.

By virtue of the above-described arrangement of the bearing lubricating structure for rotary machinery according to the present invention, the lubricating oil that is sucked from the guide groove through the suction nozzle is supplied to the bearing from the oiling nozzle through the lubricant passage provided inside the rotating shaft. Accordingly, a sufficiently large amount of lubricating oil can be supplied to the bearing by the oiling nozzle that performs a pumping action induced by the rotation of the shaft. Thus, the bearing can be cooled sufficiently. Since the lubricating oil passes through the lubricant passage inside the rotating shaft, the rotating shaft is also cooled. Therefore, the temperature difference between the inner and outer rings of the bearing can be minimized. Accordingly, it is possible to prevent burnout of the bearing.

The above and other objects, features and advantages of the present invention will become more apparent from the following description when taken in conjunction with the accompanying drawings in which a preferred embodiment of the present invention is shown by way of illustrative examples.

PREFERRED EMBODIMENT OF THE INVENTION

Figure 1:
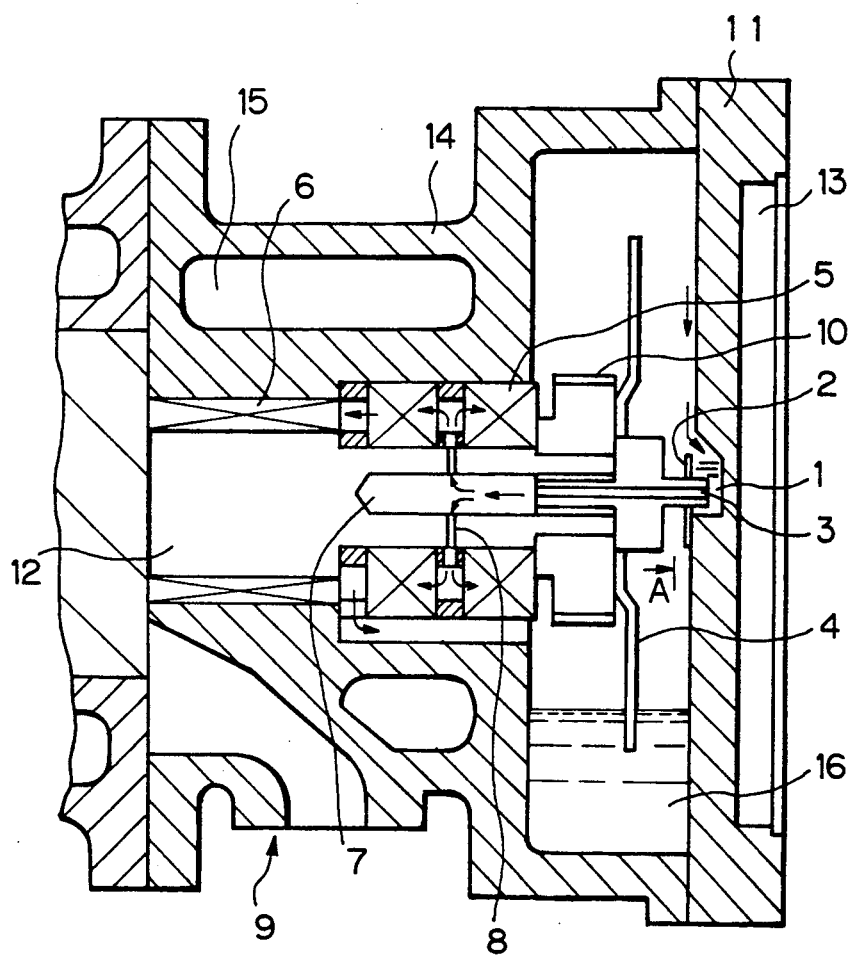
FIG. 1 is a sectional view showing the structure of a bearing part of a screw vacuum pump to which the bearing lubricating structure for rotary machinery of the present invention is applied.
Figure 2:
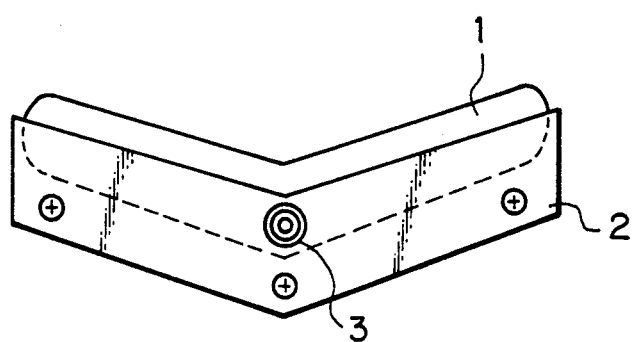
FIG. 2 shows a guide groove as seen from the direction of the arrow A in FIG. 1.

One embodiment of the present invention will be described below with reference to the accompanying drawings. FIG. 1 is a sectional view showing the structure of a bearing part of a screw vacuum pump to which the bearing lubricating structure for rotary machinery of the present invention is applied. FIG. 2 is a view seen from the direction of the arrow A in FIG. 1. As illustrated in the figures, a rotor shaft 12 is rotatably supported by a rolling bearing 5 inside a casing 14. An oil reservoir 16 is provided in the lower part of a bearing chamber accommodating the rolling bearing 5. An oil disk 4 is attached to the end of the rotor shaft 12 and immersed in lubricating oil in the oil reservoir 16 so that the lubricating oil is splashed by the oil disk 4.

The inner wall of a cover 11 attached to an end of the casing 14 is provided with a guide groove 1 for collecting lubricating oil that is splashed by the oil disk 4 and flows down on the inner wall of the cover 11. A cover plate 2 is provided on the inner wall to form one side of the guide groove 1. A suction nozzle 3 is attached to the end of the rotor shaft 12 and is inserted into the guide groove 1 to suck the lubricating oil collected in the guide groove 1, as shown in FIG. 2. It should be noted that FIG. 2 shows the guide groove 1 as seen from the direction of the arrow A in FIG. 1. As shown, the guide groove 1 has a V-shaped elevational configuration to guide the lubricating oil to the suction nozzle 3. Further, a lubricant passage 7 extends through the inside of the rotor shaft 12 to pass the lubricating oil sucked through the suction nozzle 3. An oiling nozzle 8 is communicated with the lubricant passage 7. The oiling nozzle 8 performs a pumping action induced by the rotation of the rotor shaft 12.

The lubricating oil in the guide groove 1 is sucked through the suction nozzle 3 by the centrifugal pumping action of the oiling nozzle 8 induced by the rotation of the rotor shaft 12. Then, the lubricating oil is supplied to the rolling bearing 5 through the lubricant passage 7. Thus, since the lubricating oil passes through the lubricant passage 7 provided inside the rotor shaft 12, the rotor shaft 12 is also cooled. The feed rate of lubricating oil is determined by the speed of rotation of the rotor shaft 12 and the diameters of the openings of the suction and oiling nozzles 3 and 8. Accordingly, an appropriate oil feed rate can be obtained by changing the diameters of the nozzle openings. Reference numeral 13 denotes a cooling jacket that is provided inside the cover 11. The provision of cooling jacket 13 makes it possible to cool the lubricating oil in the oil reservoir 16 and the guide groove 1 and the lubricating oil flowing down the inner wall of the cover 11 by a simple and easy method. If a bent portion is provided on the distal end of the oil disk 4, it is possible to splash and supply a larger amount of lubricating oil. In FIG. 1, reference numeral 9 denotes a discharge opening of the vacuum pump, 10 a timing gear attached to the end of the rotor shaft 12, and 15 a cooling jacket provided inside the casing 14.

Figure 3:
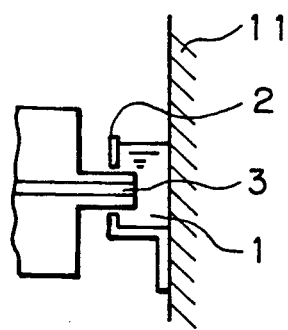
FIG. 3 shows another example of the guide groove.

It should be noted that the guide groove 1 may be formed by attaching a bent cover plate 2 having an L-shaped cross-sectional configuration to the inner wall surface of the cover 11, as shown in FIG. 3. Also, the suction nozzle 3 may be integrally formed with the rotating shaft 12 at the end thereof. Further, the invention can be applied to a journal bearing other than a rolling bearing.

As has been described above, the present invention provides the following advantageous effects:

(1) The lubricating oil is sucked from the guide groove through the suction nozzle and supplied to the bearing from the oiling nozzle through the lubricant passage inside the rotating shaft. Since the lubricating oil is sucked by the centrifugal pumping action of the oiling nozzle induced by the rotation of the shaft, a sufficiently large amount of lubricating oil can be supplied to the bearing. Accordingly, the bearing can be cooled sufficiently.

(2) Since the lubricating oil passes through the lubricant passage provided inside the rotating shaft, the rotating shaft is also cooled, so that the temperature difference between the inner and outer rings of the bearing can be minimized. Accordingly, it is possible to prevent burnout of the bearing.

What is claimed is:

1. A bearing lubricating structure for rotary machinery having a rotor rotatably supported by a bearing in a casing, an oil reservoir provided in a lower part of a bearing chamber accommodating said bearing, and an oil disk attached to an end of a rotating shaft of said rotor and immersed in lubricating oil in said oil reservoir so as to supply said bearing with lubricating oil splashed by said oil disk, said bearing lubricating structure comprising:

a guide groove for collecting lubricating oil flowing down an inner wall of a cover attached to an end of said casing;

a suction nozzle inserted into said guide groove to suck lubricating oil collected in said guide groove;

a lubricant passage extending through the inside of said rotating shaft to supply said bearing with lubricating oil sucked through said suction nozzle; and an oiling nozzle communicated with said lubricant passage and performing a pumping action induced by the rotation of said shaft.

2. A bearing lubricating structure claimed in claim 1, wherein said guide groove is formed in said inner wall of said cover.

3. A bearing lubricating structure claimed in claim 2, wherein a cover plate is attached to said inner wall of said cover to cover one side of said guide groove.

4. A bearing lubricating structure claimed in claim 1, wherein said guide groove is formed by attaching a bent cover plate having an L-shaped cross-sectional configuration to said inner wall of said cover.

5. A bearing lubricating structure claimed in any one of claims 2 to 4, wherein said guide groove has a V-shaped elevational configuration to guide said lubricating oil to said suction nozzle.

6. A bearing lubricating structure claimed in claim 1, wherein said suction nozzle is attached to the end of said rotating shaft.

7. A bearing lubricating structure claimed in claim 1, wherein said suction nozzle is integrally formed with said rotating shaft at the end thereof.

8. A bearing lubricating structure claimed in any one of claims 1 to 4, 6 or 7, wherein said bearing is a roller bearing.

9. A bearing lubricating structure claimed in one of claims 1 to 4, 6 or 7, wherein a cooling jacket is provided inside said cover to cool the lubricating oil in said oil reservoir and said guiding nozzle and the lubricating oil flowing down said inner wall of said cover.

* * * * *

UNITED STATES PATENT AND TRADEMARK OFFICE
CERTIFICATE OF CORRECTION

PATENT NO. : 5,312,192
DATED : May 17, 1994
INVENTOR(S) : Noburu Shimizu et al.

It is certified that error appears in the above-indentified patent and that said Letters Patent is hereby corrected as shown below:

On the title page, Item [19] and [75],

The first inventor's last name is spelled incorrectly, should read: [19] --Shimizu et al.--

[75] --Shimizu--

Signed and Sealed this

Sixteenth Day of August, 1994

Attest:

BRUCE LEHMAN

Attesting Officer

Commissioner of Patents and Trademarks